(12) United States Patent
Aggarwal et al.

(10) Patent No.: US 7,979,395 B1
(45) Date of Patent: Jul. 12, 2011

(54) METHOD AND SYSTEM FOR DETERMINING RECLAIMABLE SPACE OCCUPIED BY A SET OF SNAPSHOTS

(75) Inventors: Himanshu Aggarwal, Cary, NC (US); Andy C. Kahn, San Francisco, CA (US); Eric C. Hamilton, Durham, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 602 days.

(21) Appl. No.: 10/973,159

(22) Filed: Oct. 25, 2004

(51) Int. Cl.
    *G06F 7/00* (2006.01)

(52) U.S. Cl. ........................................ 707/649

(58) Field of Classification Search .................. 707/100, 707/649
    See application file for complete search history.

(56) References Cited

U.S. PATENT DOCUMENTS
2001/0044807 A1* 11/2001 Kleiman et al. .............. 707/203
* cited by examiner

*Primary Examiner* — Apu M Mofiz
*Assistant Examiner* — Ajith Jacob
(74) *Attorney, Agent, or Firm* — Blakely, Sokoloff, Taylor & Zafman LLP (57) ABSTRACT

A storage system, such as a file server, creates persistent consistency point images (PCPI) or "snapshots" that are point-in-time representations of the storage system. The storage system uses persistent consistency point images to backup or mirror data. Using data already found in the data block maps associated with these PCPI, the amount of space used by a set of these consistency points can be determined.

30 Claims, 7 Drawing Sheets

| Snapshot | 4 | 5 | 6 | 7 |
|---|---|---|---|---|
| Block Value | 0 | 0 | 1 | 0 |

7a

| Snapshot | 4 | 5 | 6 | 7 |
|---|---|---|---|---|
| Block Value | 0 | 1 | 1 | 0 |

7b

| Snapshot | 4 | 5 | 6 | 7 |
|---|---|---|---|---|
| Block Value | 0 | 1 | 1 | 1 |

7c

| Snapshot | 4 | 5 | 6 | 7 |
|---|---|---|---|---|
| Block Value | 0 | 1 | 0 | 1 |

METHOD AND SYSTEM FOR DETERMINING RECLAIMABLE SPACE OCCUPIED BY A SET OF SNAPSHOTS

FIELD OF THE INVENTION

At least one embodiment of the present invention pertains to storage systems, and more particularly, to a method and system for determining the reclaimable space occupied by a set of snapshots.

BACKGROUND OF THE INVENTION

Various forms of storage systems using redundant storage devices and techniques have been developed to help keep digital data safe. From creating a backup, to using simple RAIDs (redundant array of inexpensive disks), to using more dedicated solutions such as storage area networks (SAN) and network attached storage (NAS), users have attempted to make sure that their data is safe and easily accessible.

While these solutions help users to ensure that their data is safe and accessible, each backup system has a cost associated with it. For disk removable media backup such as CDROM or DVD, that cost is the time to write a disk and the cost of the disk itself. For SANs and NAS solutions that cost is the use of memory space (typically harddrive space) to maintain copies of data and the costs of the devices themselves (SANs and NASs are expensive). The copies could be older data such that a restoration to a previous point in time is possible or they could be redundant copies of current data on several disks (with the idea that at least one of those disks should always work).

A storage system can be deployed within a storage area network (SAN) or a network attached storage (NAS) environment, for example. When used within a NAS environment, the storage system may be embodied as a file server (sometimes called a "filer") including an operating system that implements a file system to logically organize the information as a hierarchical structure of directories and files on disks or other memory devices. Each "on-disk" file may be implemented as a set of data structures configured to store information. A directory may be implemented as a specially formatted file in which information about other files and directories are stored.

The file server, or "filer", may be further configured to operate according to a client/server model of information delivery to thereby allow many client systems (clients) to access shared resources, such as files, stored on the filer. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus." In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the client requesting the information maintains file mappings and manages file semantics.

One way to represent the data of a storage system is to use persistent consistency point images (PCPI) or "snapshots" as point-in-time representations of the storage system. More specifically these snapshots are representations of the active file system of the storage system. Some storage systems use snapshots to facilitate mirroring or other backup operations. These snapshots can be stored on a storage device or in other persistent memory and have a name or other identifier that distinguishes it from other snapshots taken at other points in time. Storage operating systems implementing snapshots typically provide a command to enable a user or administrator to obtain information about snapshot consumption of available disk space by determining the percentage of space exclusively utilized by each snapshot associated with the storage system.

While knowing how much space is consumed by only an individual snapshot is important, it is also very important to know how much space multiple snapshots use together. This is important for such tasks as knowing how much space will be freed/reclaimable after a set of snapshots is deleted. Unfortunately, because different snapshots can use the same blocks in some systems, it is hard to estimate how much space would be freed by deleting a set of snapshots. What is needed now to further improve the efficiency of storage systems is a way to determine how much space a set of snapshots occupies together.

SUMMARY OF INVENTION

The present invention includes a method which includes creating a plurality of snapshots of data stored in a storage system, each of the snapshots using one or more blocks, the plurality of snapshots including a set of snapshots, and for a particular snapshot within the set of snapshots, determining the number of blocks in said particular snapshot which are shared with another snapshot that is not in the set. The method further includes for a particular snapshot within the set of snapshots, determining the number of blocks in said particular snapshot which are shared with another snapshot that is in the set.

The invention further includes a system and apparatus that can perform such a method.

Other aspects of the invention will be apparent from the accompanying figures and from the detailed description which follows.

DETAILED DESCRIPTION

A method and System for determining the amount of reclaimable space occupied by a set of snapshots is described. In the following description, numerous specific details are set forth in order to provide a thorough understanding of the present invention. It will be apparent to one skilled in the art, that the present invention may be practiced without these specific details. In other instances, well-known storage system designs and implementations are not described in detail in order to facilitate description.

As described in greater detail below, by creating a plurality of snapshots of data stored in a storage system, each of the snapshots using one or more blocks, the plurality of snapshots including a set of snapshots, and for a particular snapshot within the set of snapshots, determining the number of blocks in said particular snapshot which are shared with another snapshot, the amount of space reclaimable by deleting the set of snapshots can be determined by summing for all of the snapshots of the set the number of blocks shared with other snapshots.

Figure 1:
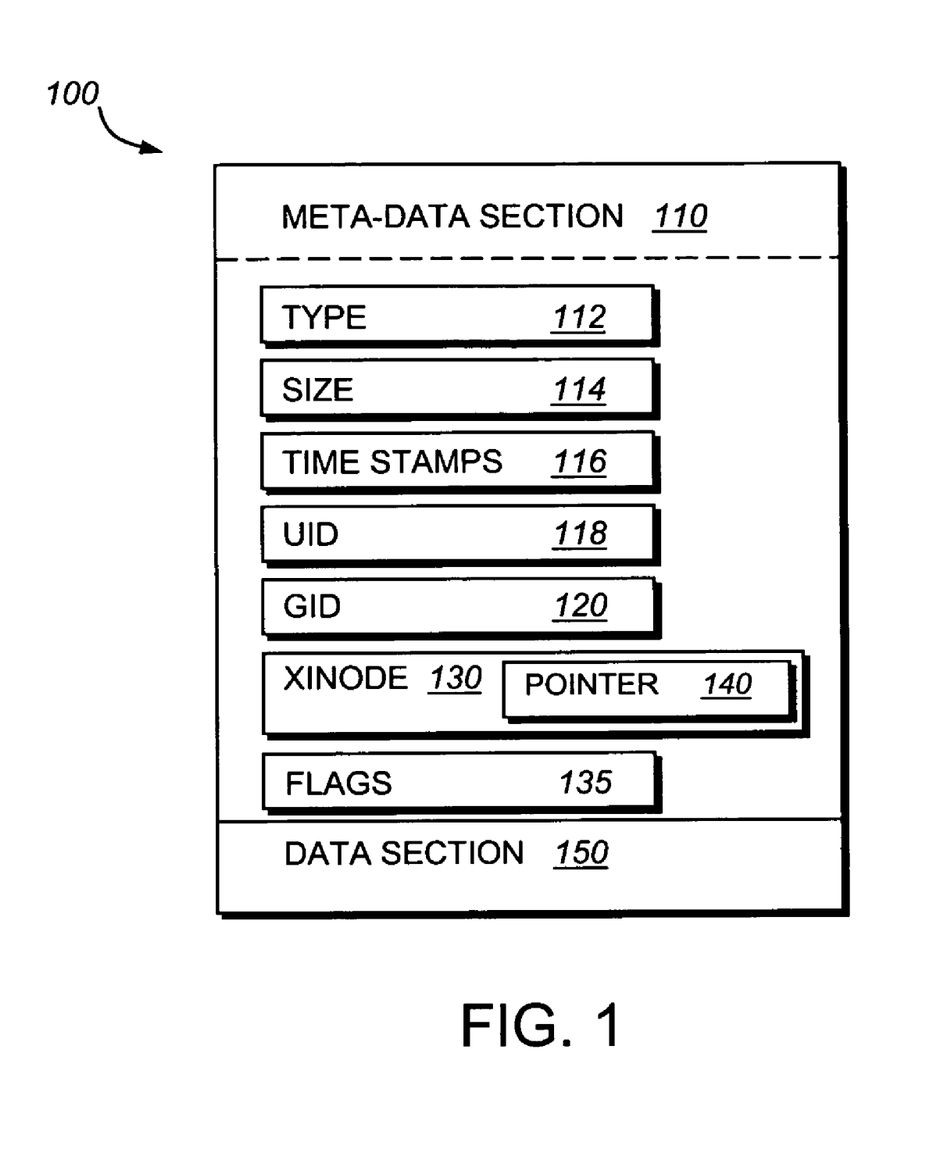
FIG. 1 is a schematic block diagram of an exemplary inode in accordance with an embodiment of the present invention.

An example of a file system used in a storage server is the Write Anywhere File Layout (WAFL®) file system, by Network Appliance, Inc., of Sunnyvale, Calif., which is used in Filer products made by Network Appliance. In the WAFL file system, a file is represented in a data structure called an inode data structure adapted for storage on disks. FIG. 1 is a schematic block diagram illustrating an exemplary on-disk inode 100, which preferably includes a meta data section 110 and a data section 150. The information stored in the meta data section 110 of each inode 100 describes a file and, as such, includes the type (e.g., regular or directory) 112 of the file, the size 114 of a file, time stamps (e.g., accessed and/or modification) 116 for the file and ownership, i.e., user identifier (UID 118) and group identifier (GID 120), of the file. The meta data section 110 further includes an xinode field 130 containing a pointer 140 that references another on-disk inode structure containing, e.g., access control list (ACL) information associated with the file or directory.

The inode 100 may also include a flags field 135 where various flags associated with the inode and the file system. The contents of the data section 150 of each inode may be interpreted differently depending upon the type of file (inode) defined within the type field 112. For example, the data section 150 of a directory inode contains meta data controlled by the file system, whereas the data section of a regular inode contains user-defined data. In this latter case the data section 150 includes a representation of the data associated with the file.

Specifically, the data section 150 of a regular on-disk inode may include user data or pointers, the latter referencing 4 kilobyte (KB) data blocks on disk used to store the user data. Each pointer is preferably a logical volume block number which is thereby facilitate efficiency among a file system and/or disk storage layer of an operating system when accessing the data on disks. Given the restricted size (e.g., 128 bytes) of the inode, user data having a size that is less than or equal to 64 bytes is represented in its entirety within the data section of an inode. However if the user data is greater than 64 bytes but less than or equal to 64 kilobytes (KB), then the data section of the inode comprises up to 16 pointers, each of which references a 4 KB block of data on disk. Moreover, if the size of the data is greater than 64 KB but less than or equal to 64 megabytes (MB), then each pointer in the data section 150 of the inode references an indirect inode that contains 1024 pointers, each of which references a 4 KB data block on disk.

A persistent consistency point image (PCPI) is a point-in-time representation of the storage system, and more particularly, of the active file system, stored on a storage device or in other persistent memory and having a name or other identifier that distinguishes it from other PCPIs taken at other points in time. A PCPI may be used, for example, to enable data mirroring and/or to allow recovery of stored data in the event of a failure of the storage system. A PCPI can also include other information (metadata) about the active file system at the particular point in time for which the image is taken. The terms "PCPI" and "snapshot" shall be used interchangeably through out this patent without derogation of Network Appliance's trademark rights in the mark Snapshot™.

Figure 2:
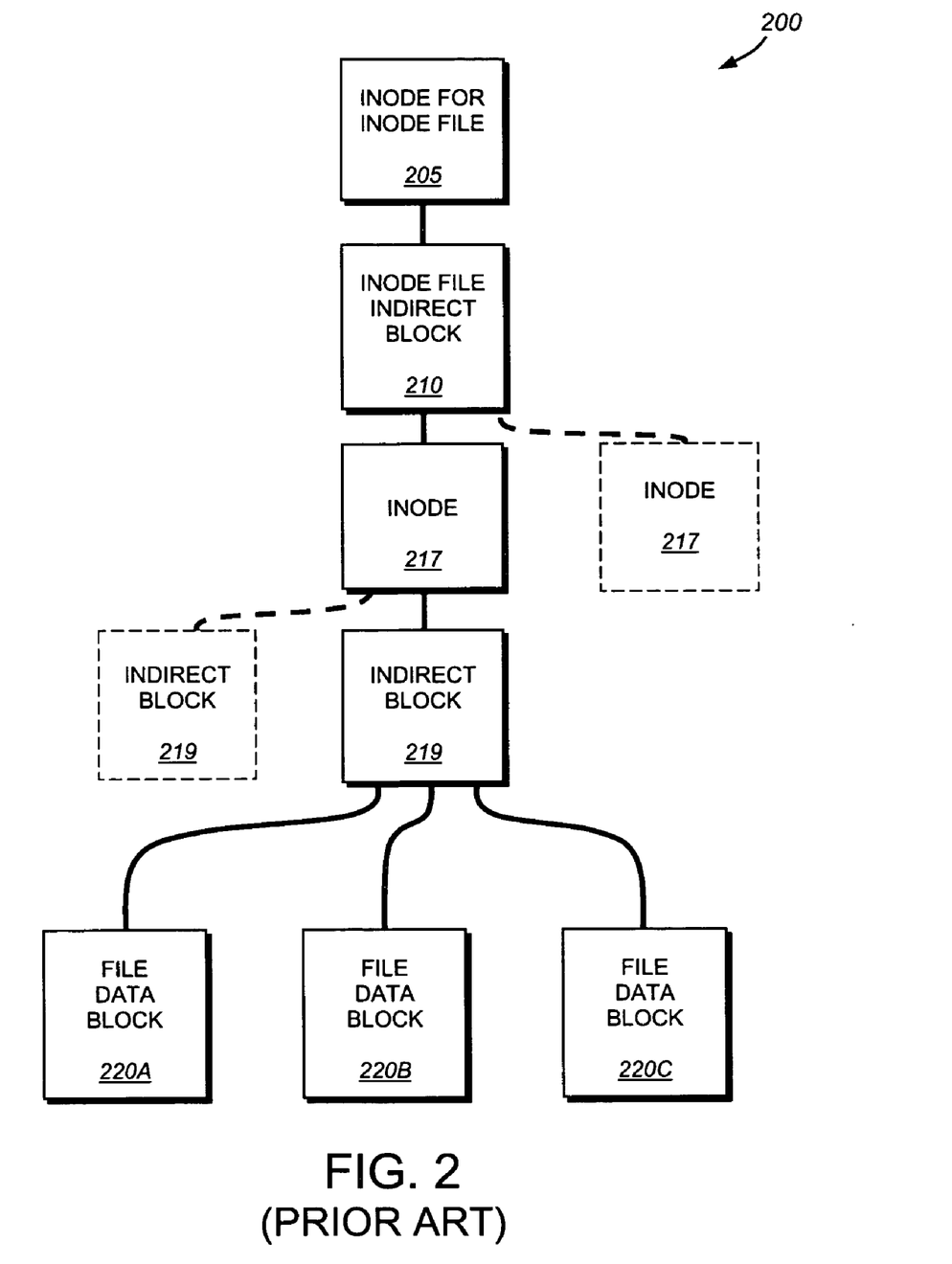
FIG. 2 is a schematic block diagram of an exemplary inode tree.
Figure 3:
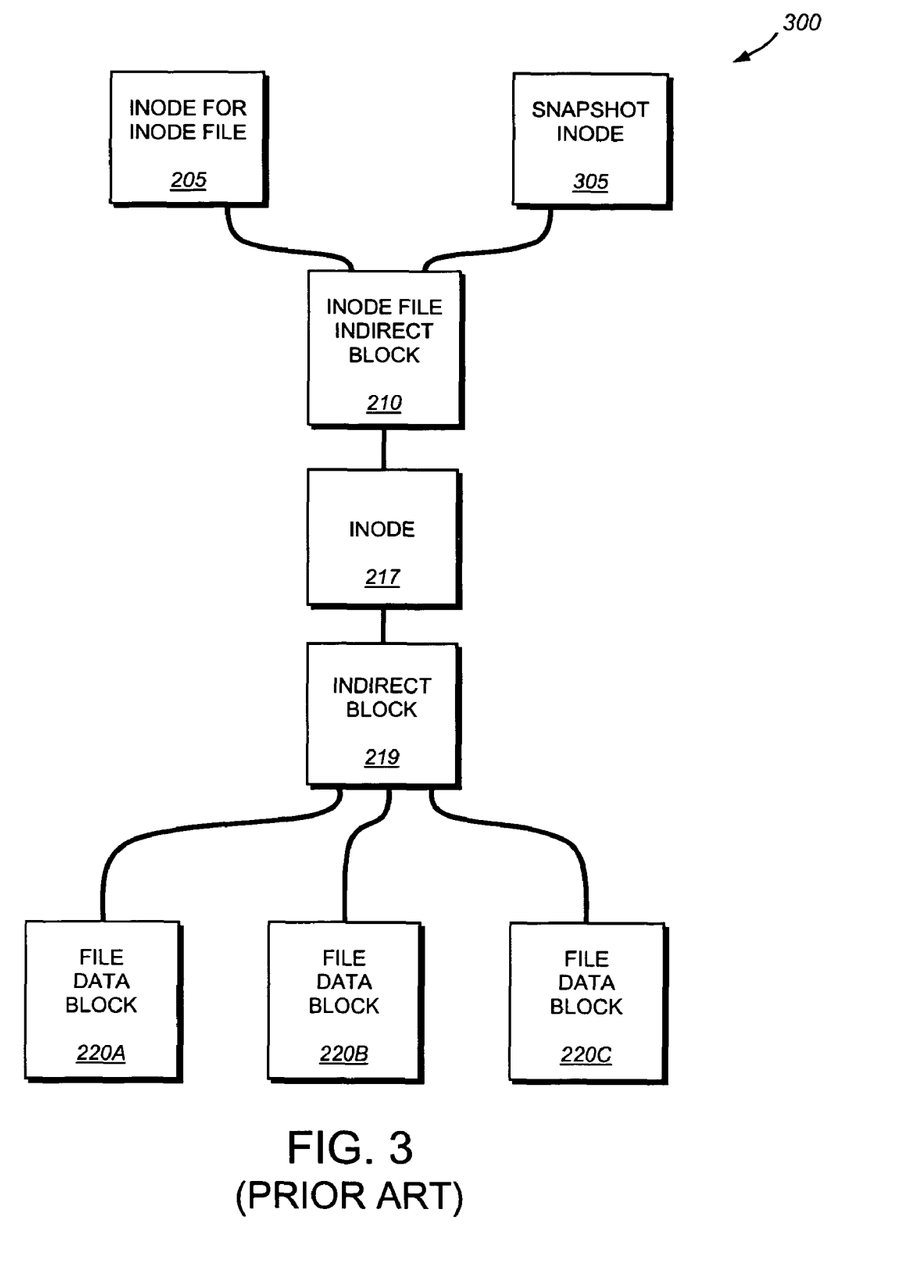
FIG. 3 is a schematic block diagram of an exemplary inode tree showing a snapshot inode.

When the file system generates a snapshot of a given file system, a snapshot inode is generated as shown in FIG. 3. The snapshot inode 305 is, in essence, a duplicate copy of the inode for the inode file 205 of the file system 200. Thus, the exemplary file system structure 200 includes the inode file indirect blocks 210, inodes 217, indirect blocks 219 and file data blocks 220A-C as in FIG. 2. When a user modifies a file data block, the file system layer writes the new data block to disk and changes the active file system to point to the newly created block.

Figure 4:
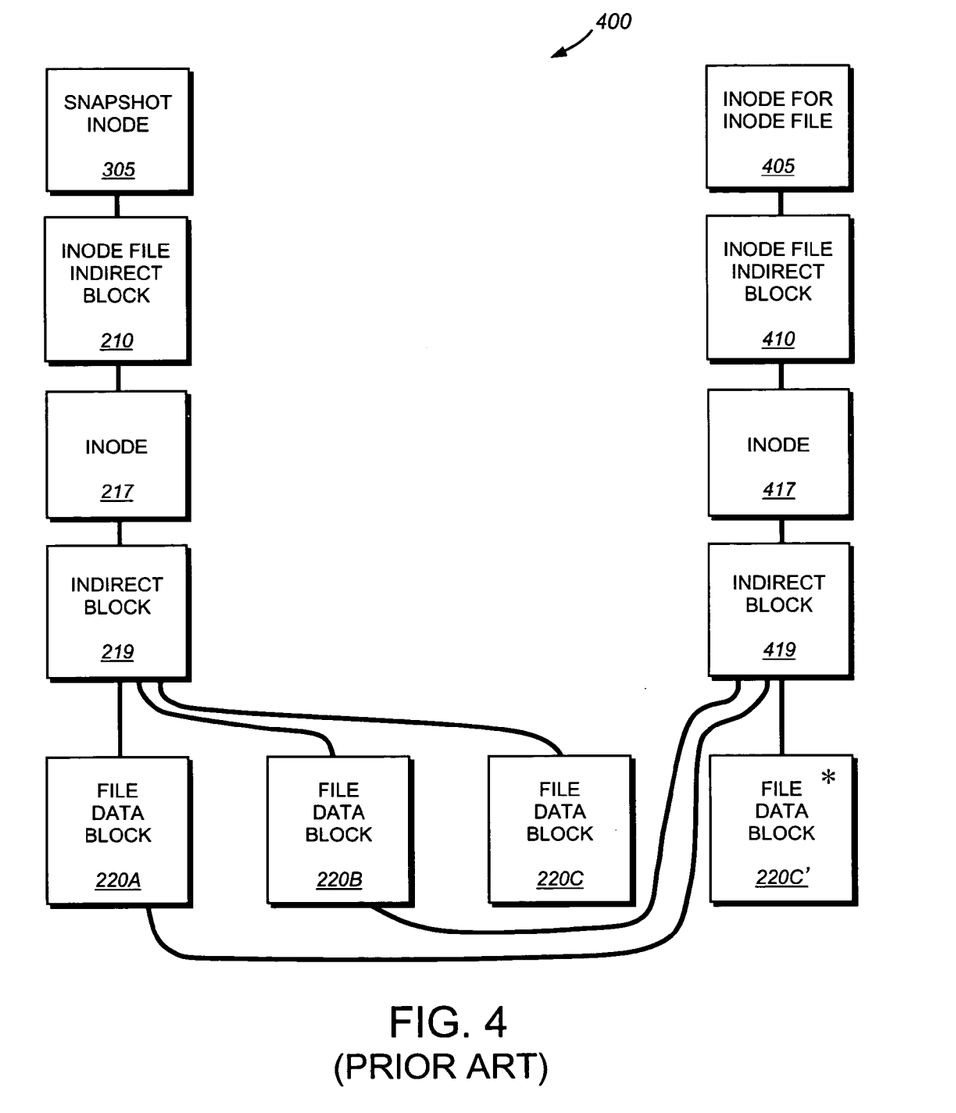
FIG. 4 is a schematic block diagram of an exemplary inode tree and snapshot inode tree showing data being written to a file after a snapshot was generated.

FIG. 4 shows an exemplary inode file system structure 400 after a file data block has been modified. In this illustrative example, file data block 220C was modified to file data block 220C'. When file data block 220C is modified to file data block 220C', the contents of the modified file data block are written to a new location on disk as a function of the exemplary WAFL file system. Because of this new location, the indirect block 419 must be rewritten. Due to this changed indirect block 419, the inode 417 must be rewritten. Similarly, the inode file indirect block 410 and the inode for the inode file 405 must be rewritten. Thus, after a file data block has been modified, the snapshot inode 305 contains a point to the original inode file indirect block 210 which in turn contains pointers through the inode 217, and an indirect block 219 to the original file data blocks 220A, 220B and 220C. However, the newly written indirect block 419 includes pointers to unmodified file data blocks 220A and 220B. The indirect block 419 also contains a pointer to the modified file data block 220C', representing the new arrangement of the active file system. A new inode for the inode file 405 is established representing the new structure 400. Note that metadata (not shown) stored in any snapshotted blocks (e.g., 305, 210, and 220C) protects these blocks from being recycled or overwritten until they are released from all snapshots. Thus, while the active file system inode for the inode file 405 points to new blocks 220A, 220B and 220C', the old blocks 210, 217, 219 and 220C are retained until the snapshot is fully released.

Storage System Environment

Figure 5:
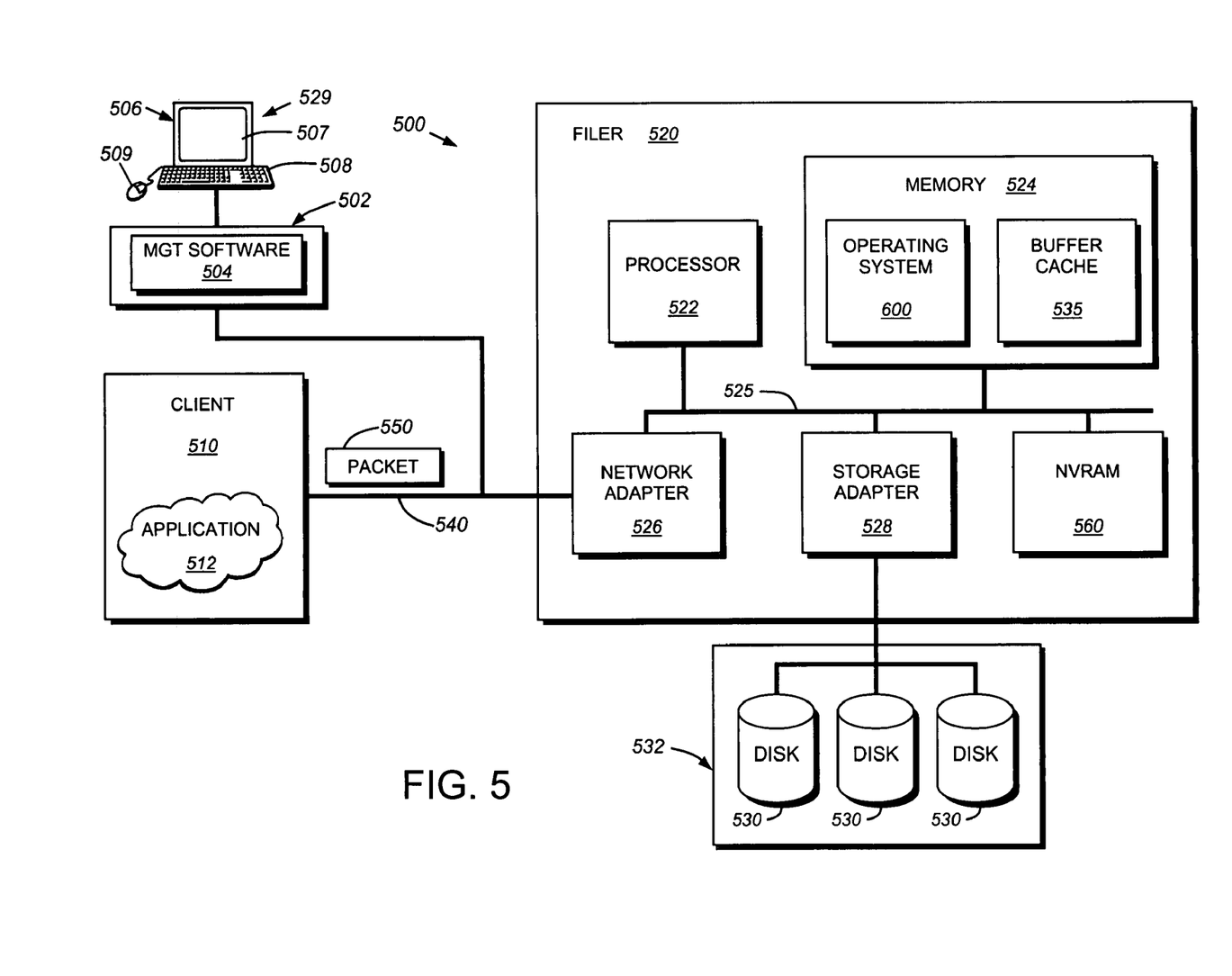
FIG. 5 is a schematic block diagram of an exemplary file server environment in accordance with an embodiment of the present invention.

FIG. 5 is a schematic block diagram of a storage system environment 500 that includes a client 510 having one or more applications 512, and an interconnected file server 520 that may be advantageously used with the present invention. The filer server or "filer" 520 is a computer that provides file service relating to the organization of information on storage devices, such as disks 530. It will be understood by those skilled in the art that the inventive technique described herein may apply to any type of special-purpose computer (e.g., server) or general-purpose computer, including a standalone computer. The filer 520 comprises a processor 522, a memory 524, a network adapter 526 and a storage adapter 528 interconnected by a system bus 525. The filer 520 also includes a storage operating system 600 that implements a file system to logically organize the information as a hierarchical structure of directories and files on the disks. A console or other user interface 529 is provided to control various filer functions, including those implemented according to this invention, and reports on the status of filer operations.

It will be understood by those skilled in the art that the inventive technique described herein may apply to any type of special-purpose computer (e.g., file serving appliance) or general-purpose computer, including a standalone computer, embodied as a storage system. To that end, filer 520 can be broadly, and alternatively, referred to as a storage system. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

Figure 6:
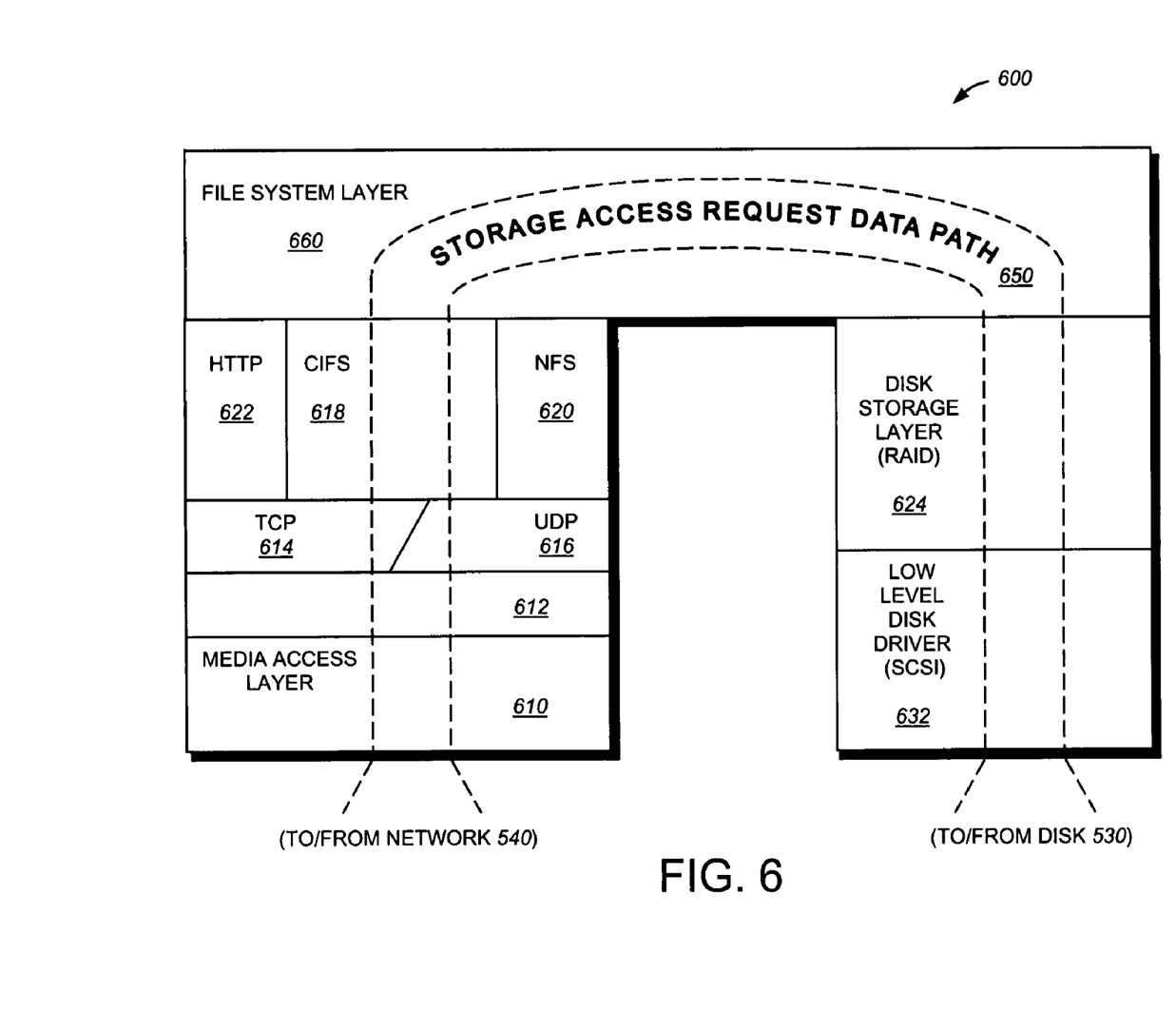
FIG. 6 is a schematic block diagram of an exemplary storage operating system in accordance with an embodiment of the present invention.

In the illustrative embodiment, the memory 524 comprises storage locations that are addressable by the processor and adapters for storing software program code. A portion of the memory may be further organized as a "buffer cache" 535 for storing data structures that are passed between disks and the network during normal runtime operation. The memory comprises a form of random access memory (RAM) that is generally cleared by a power cycle or other reboot operation (e.g., it is a "volatile" memory). The processor and adapters may, in turn, comprise processing elements and/or logic circuitry configured to execute the software code and manipulate the data structures. The operating system 600, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 526 comprises the mechanical, electrical and signaling circuitry needed to connect the filer 520 to a client 510 over a computer network 540, which may comprise a point-to-point connection or a shared medium, such as a local area network. The client 510 may be a general-purpose computer configured to execute applications 512, such as a database application. Moreover, the client 510 may interact with the filer 520 in accordance with a client/server model of information delivery. That is, the client may request the services of the filer, and the filer may return the results of the services requested by the client, by exchanging packets 550 encapsulating, e.g., the CIFS protocol or NFS protocol format over the network 540.

The storage adapter 528 cooperates with the operating system 600 executing on the filer to access information requested by the client. The information may be stored on the disks 530 of a disk shelf 532 that is attached, via the storage adapter 528 to the filer 520 or other node of a storage system as defined herein. The storage adapter 528 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 522 (or the adapter 528 itself) prior to being forwarded over the system bus 525 to the network adapter 526, where the information is formatted into a packet and returned to the client 510.

In one exemplary filer implementation, the filer 520 can include a nonvolatile random access memory (NVRAM) 560 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled, in parallel with the buffer cache, after each client request is completed, but before the result of the request is returned to the requesting client.

Connected to the LAN 540 may be a station using which a maintenance operator can interface with the system. A management station 502 can include a server or PC-based computer in a console 529 with a network interface for communicating over the LAN 540. Within the management station 502, resides appropriate management software 504. A graphical user interface (GUI) 506 may include a display 507, a keyboard 508 and a mouse 509 so that a maintenance operator can enter commands into the system.

In an illustrative embodiment, the disk shelf 532 is arranged as a plurality of separate disks 530. The disk shelf 532 may include, in some embodiments, dual connectors for redundant data paths. The disks 530 are arranged into a plurality of volumes, each having a file system associated therewith. The volumes each include one or more disks 530. In one embodiment, the physical disks 530 are configured into RAID groups so that some disks store striped data and some disks store separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume.

Storage Operating System

To facilitate generalized access to the disks on the array, a storage operating system 600 (FIG. 6) implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which other files and directories are stored. In one embodiment, the storage operating system is one that implements a write anywhere file layout file (WAFL) system such as Network Appliance's ONTAP™.

The term "storage operating system" generally refers to the computer-executable code operable on a storage system that manages data access and, in the case of a file server, implements file system semantics (such as the above-referenced WAFL file system).

The organization of the preferred storage operating system for an embodiment of a filer is now described briefly. As shown in FIG. 6, the storage operating system 600 comprises a series of software layers, including a media access layer 610 of network drivers including but not limited to Ethernet. The operating system further includes network protocol layers, such as the Internet Protocol (IP) layer 612 and its supporting transport mechanisms, the Transport Control Protocol (TCP) layer 614 and the User Datagram Protocol (UDP) layer 616. A file system protocol layer provides multi-protocol data access and, to that end, includes support for the CIFS protocol 618, the NFS protocol 620 and the Hypertext Transfer Protocol (HTTP) protocol 622. In addition, the storage operating system 600 includes a disk storage layer 624 that implements a disk storage protocol, such as a RAID protocol, a disk configuration verification layer 626, a disk driver layer 628, a storage disk manager layer 630 and a low-level disk driver that implements a disk control protocol such as the small computer system interface (SCSI) 632.

Bridging the disk software layers with the network and file system protocol layers is a file system layer 660 of the storage operating system 600. Generally, the layer 660 implements a file system having an on-disk format representation that is block-based using, e.g., 4-kilobyte (KB) data blocks and using inodes to describe the files. Note that while files are implemented in an illustrative embodiment, the term "file" should be taken broadly to include any type of data organization or "data container", including those used by block-level protocols, such as SCSI. The term "data container" will therefore be used interchangeably for files herein. As used herein, a file system is a programmatic entity that imposes structure on the address space of one or more physical or virtual disks so that the storage operating system may conveniently deal with data containers, including files. An "active file system" is a file system to which data can be both written and read, or, more generally, an active store that responds to both read and write I/O operations. A snapshot is a reference store or image of the file system at a point in time that is typically read-only.

The term "data container", as noted above, shall refer generally to a file, LUN (logical unit number), or any other separately or individually addressable data structure or logical group of data blocks residing on persistent storage. The term "volume" in this context shall refer to a logical group of data containers. The term "directory" shall refer to an organizational structure that facilitates access to a given data container through traversal of trees or other logical indexing structures. Likewise, the term "pathway" or "path" shall refer to the route taken by the storage operating system through the directory structure in addressing the data container. In addition, it is expressly contemplated that the teachings of the present invention can be applied to a variety of storage environments and data types including, but not limited to, file data, database data and/or block-level data.

In response to transaction requests, the file system generates operations to load (retrieve) the requested data from volumes if it is not resident "in-core" in the filer's memory. If the information is not in memory, the file system layer 660 indexes into the Mode file using the Mode number to access an appropriate entry and retrieve a logical volume block number. The file system layer 660 then passes the logical volume block number to the disk storage (RAID) layer 624, which maps that logical number to a disk block number and sends the latter to an appropriate driver (for example, an encapsulation of SCSI implemented on a fibre channel disk interconnection) of the disk driver layer 626. The disk driver accesses the disk block number from volumes and loads the requested data in memory for processing by the filer. Upon completion of the request, the filer (and storage operating system) returns a reply to the client over the network. An embodiment of a reply is a conventional acknowledgement packet defined by the Common Internet File System (CIFS) specification.

It should be noted that the software "path" 650 through the storage operating system layers described above needed to perform data storage access for the client request received at the filer may alternatively be implemented in hardware or a combination of hardware and software. That is, in an alternate embodiment, the storage access request data path 650 may be implemented as logic circuitry embodied within a field programmable gate array (FPGA) or an application specific integrated circuit (ASIC). This type of hardware implementation increases the performance of the file service provided by filer in response to a file system request packet issued by client.

Invariant Property

In an embodiment of the write-anywhere file system it is required that if a block is used by any snapshot other than the active file system, the block may then not be then allocated in the active file system. Each snapshot has an associated block map that contains information about what blocks are used by that snapshot. In one embodiment, if a block in the block map has a value of 1, then a snapshot uses that block. Conversely, if a block has a value of 0 then a snapshot does not use that block. An additional property of the write-anywhere file system is that once a block is used (becomes a 1) and later becomes unused, it cannot become a 1 again. The term for this association is "010" invariant. It should be understood that more than one snapshot can use a block. For example, snapshot 4 does not use a block, while the next snapshot taken, snapshot 5, does, as does the snapshot after that, snapshot 6. Finally, snapshot 7 does not use the block. Accordingly, the values for this block in the block maps of these snapshots are 0110, respectively.

Figure 7:
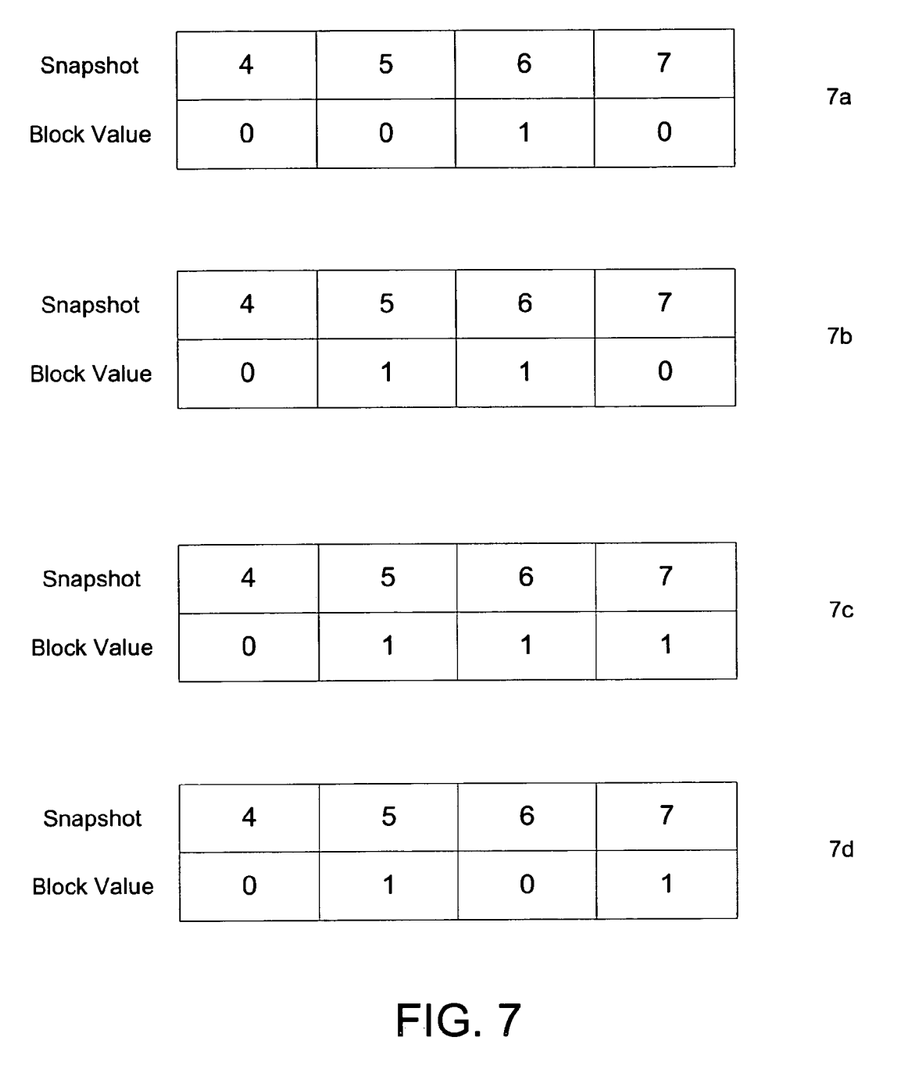
FIG. 7 illustrates exemplary block usage by a plurality of snapshots.

FIG. 7 illustrates several examples of block usage by snapshots. In FIG. 7a, only snapshot 6 uses the block. In FIG. 7b, snapshots 5 and 6 use the same block. This means that between the creation of snapshot 5 and 6 the data in this block did not change. It is acceptable for snapshots to concurrently use the same block so long as the snapshots are adjacent by time of creation. For instance, where snapshot 6 was the next snapshot created after 5 both can use the same block. FIG. 7c shows that snapshots 5, 6, and 7 are all using the same block. What should not happen in a 010 invariant system is depicted in FIG. 7d. In this depiction, both snapshots 5 and 7 use the same block after snapshot 6 did not. However, occasionally this does happen upon events such as restoring the active file system from a snapshot.

Blocks Reclaimable

In situations such as depicted in FIG. 7a, if the 010 invariant is intact it is easy to tell how many blocks are only used by a single snapshot. Each block that is only used by a single snapshot can be determined by looking at the adjacent neighbors of that snapshot. For instance, in FIG. 7a, looking at snapshots 5 and 7 to determine if snapshot 6 is the sole user of a block. This is described by the function:

$$\overline{S_{a-1}}S_a\overline{S_{a+1}} \tag{1}$$

$S_a$ is the snapshot for which a determination of sole block use is desired. $S_{a-1}$ and $S_{a+1}$ are the adjacent in time snapshots to $S_a$. In the above example, $S_a$=snapshot 6, $S_{a-1}$ is snapshot 5, and $S_{a+1}$ is snapshot 7. If the result of the function is true (a "1"), then the block only belongs to $S_a$ and is reclaimable. Being reclaimable means that upon deletion of snapshot 6 the block is freed to be used by another snapshot. If the result of the function is false ("0"), then that block is not reclaimable if just deleting $S_a$. Repeating this function for all of the blocks of the snapshot $S_a$ and keeping a tally of all of the true results provides for the number of blocks that are reclaimable upon deletion of $S_a$. These are all of the blocks that are only used by $S_a$.

However, determining the number of blocks reclaimable from the deletion of a set of snapshots is more difficult. Turning to FIG. 7b, snapshots 5 and 6 both use the same block. This means that if snapshot 5 alone is deleted, the block will not be freed as snapshot 6 is still using it. However, if both snapshot 5 and 6 are deleted, then the block will be reclaimable. In order to determine if a block is reclaimable upon the deletion of a set of snapshots, the adjacent snapshot neighbors need to be examined so long as the adjacent snapshot is not a part of the set. Since the set in this case is 5 and 6, these adjacent snapshots are snapshots 4 and 7. If neither snapshot 4 or 7 uses the block then the block is reclaimable. However, if either snapshot 4 or 7 does use the block, then the block is not reclaimable. This is described by the function:

$$\overline{S_{a-1}} S_a S_b \overline{S_{b+1}} \qquad (2)$$

$S_a$ and $S_b$ is the set of snapshots for which a determination of block use is desired. $S_{a-1}$ is the adjacent in time snapshots to $S_a$. $S_{b+1}$ is the adjacent in time snapshots to $S_b$. $S_{a+1}$ and $S_{b+1}$ are a part of the set to be deleted, respectively snapshots 6 and 5, and do not need to be examined again. In the above example, $S_a$=snapshot 5 and $S_{a-1}$ is snapshot 4. In the above example, $S_b$=snapshot 6 and $S_{a-1}$ is snapshot 7. If the result of the function is true (a "1"), then the block only belongs to $S_a$ and $S_b$ and is reclaimable. If the result of the function is false ("0"), then that block is not reclaimable if just deleting $S_a$ and $S_b$. This is easily extendable to more snapshots in the set where the snapshots are continuous.

If the set were to be snapshots 5, 8, and 9, the function becomes:

$$\overline{S_{a-1}} S_a \overline{S_{a+1}} \cdot \overline{S_{b-1}} S_b \cdot S_c \overline{S_{c+1}} \qquad (3)$$

This is a combination of functions (1) and (2). In this example, $S_{b+1}$ and $S_{c-1}$ are a part of the set and do not need to be checked.

If the set were to be snapshots 5, 8, and 13 the function becomes:

$$\overline{S_{a-1}} S_a \overline{S_{a+1}} \cdot \overline{S_{b-1}} S_b \overline{S_{b+1}} \cdot \overline{S_{c-1}} S_c \overline{S_{c+1}} \qquad (4)$$

In this example, $S_{a-1}$, $S_{a+1}$, $S_{b-1}$, $S_{b+1}$, $S_{c-1}$, and $S_{c+1}$ are not a part of the set and as such need to be checked.

The above illustrations assume that the 010 invariant is intact. If the 010 invariant has been broken, the function to determine the space usage of a set of snapshots becomes:

$$S_a \overline{S_b} \qquad (5)$$

This is used for all $S_a$ and $S_b$ where $S_a$ belongs to the set and $S_b$ does not. For example, if the set is snapshot 3 and snapshot 9, $S_a$ will initially be snapshot 3 and $S_b$ will be everything but snapshot 9. After determining the values for snapshot 3, $S_a$ becomes snapshot 9 and $S_b$ will be everything but snapshot 3. The sum of both values is what is reclaimable.

Of course these functions are applicable to sets of any size.

Additionally, some optimizations are inherent in this approach. As an example, if the set of snapshots includes every snapshot in the system, all of the blocks used by the snapshots will be reclaimable.

To summarize, the technique introduced herein uses the block map of each snapshot in the system to help determine what blocks would be reclaimable if a set of snapshots is deleted.

The foregoing description has been directed to specific embodiments of this invention. It will be apparent, however, that other variations and modifications may be made to the described embodiments, with the attainment of some or all of their advantages. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method comprising:
    creating a plurality of snapshots of data stored in a storage system, each of the snapshots using one or more blocks, wherein a particular snapshot is 010 invariant if each block in the snapshot is 010 invariant, and wherein a block is 010 invariant if, once that block becomes used, and later becomes unused, that block is not used again;
    storing the plurality of snapshots;
    selecting a set of snapshots to be deleted;
    determining, for the set of snapshots to be deleted, the number of blocks which are reclaimable if the set of snapshots are deleted, by determining the number of blocks which are exclusive to the set of snapshots to be deleted, wherein determining if a block is exclusive to the set of snapshots to be deleted includes:
        if the set of snapshots are 010 invariant, comparing snapshots in the set to adjacent-in-time snapshots not in the set, for each block used in a snapshot in the set, determining whether the block is used by any of the adjacent-in-time snapshots not in the set, and determining that the block is exclusive to the set of snapshots if the block is not used by any of the adjacent-in-time snapshots not in the set; and
        if the set of snapshots are not 010 invariant, comparing snapshots in the set to all snapshots not in the set, for each block used in a snapshot in the set, determining whether the block is used by any of the snapshots not in the set, and determining that the block is exclusive to the set of snapshots if the block is not used by any of the snapshots not in the set; and
    deleting the set of snapshots, said deleting including reclaiming those blocks that are exclusive to the set of snapshots.

2. The method of claim 1, wherein snapshot block data is stored in a block map.

3. The method of claim 1, wherein the storage system uses a 010 invariant scheme.

4. The method of claim 3, wherein the 010 invariant scheme has been broken.

5. A storage system comprising:
    a file server that includes a processor and a memory;
    a file system, operated by the file server, to maintain a hierarchical structure of data stored in an array of storage devices and to service read and write requests from one or more clients relating to data stored in the array of storage devices, the file system further to generate a data block map of a snapshot;
    a storage access module, executed by the processor from the memory, to control access to data stored in the array of storage devices in response to the file system, the storage access module further to receive the data block map information from the file system and to write to the data block map; and a space occupied module, executed by the processor from the memory, to determine the amount of reclaimable space occupied by a set of snapshots, wherein reclaimable space is the number of blocks that are exclusive to the set of snapshots and are not shared with another snapshot that is not in the set, wherein the space occupied module is configured to determine if a block is exclusive to the set of snapshots to be deleted by:

if the set of snapshots are 010 invariant, comparing snapshots in the set to adjacent-in-time snapshots not in the set, for each block used in a snapshot in the set, determining whether the block is used by any of the adjacent-in-time snapshots not in the set, and determining that the block is exclusive to the set of snapshots if the block is not used by any of the adjacent-in-time snapshots not in the set; and if the set of snapshots are not 010 invariant, comparing snapshots in the set to all snapshots not in the set, for each block used in a snapshot in the set, determining whether the block is used by any of the snapshots not in the set, and determining that the block is exclusive to the set of snapshots if the block is not used by any of the snapshots not in the set.

6. The storage system of claim 5, further comprising:
a sub-module, executed by the processor from the memory, to create a plurality of snapshots of data stored in a storage system, each of the snapshots using one or more blocks, wherein a particular snapshot is 010 invariant if each block in the snapshot is 010 invariant, and wherein a block is 010 invariant if, once that block becomes used, and later becomes unused, that block is not used again.

7. The storage system of claim 6, wherein block data is stored in a data block map.

8. The storage system of claim 6, wherein the storage system uses a 010 invariant scheme.

9. The storage system of claim 8, wherein the 010 invariant scheme has been broken.

10. A storage server comprising:
a network interface through which to communicate with one or more clients over a network;
a storage interface through which to communicate with an array of storage devices on which is stored multiple snapshots, wherein a particular snapshot is 010 invariant each block in the snapshot is 010 invariant, and wherein a block is 010 invariant if, once that block becomes used, and later becomes unused, that block is not used again;
a processor that controls a file system for data stored in the array of storage devices; and
a memory storing instructions which, when executed by the processor, cause the storage server to perform a set of operations, including operating the file system and determining the amount of reclaimable space occupied by a set of snapshots from the multiple snapshots, wherein the amount of reclaimable space corresponds to the number of blocks that are exclusive to the set of snapshots, wherein determining if a block is exclusive to the set of snapshots includes:
if the set of snapshots are 010 invariant, comparing snapshots in the set to adjacent-in-time snapshots not in the set, for each block used in a snapshot in the set, determining whether the block is used by any of the adjacent-in-time snapshots not in the set, and determining that the block is exclusive to the set of snapshots if the block is not used by any of the adjacent-in-time snapshots not in the set; and if the set of snapshots are not 010 invariant, comparing snapshots in the set to all snapshots not in the set, for each block used in a snapshot in the set, determining whether the block is used by any of the snapshots not in the set, and determining that the block is exclusive to the set of snapshots if the block is not used by any of the snapshots not in the set.

11. The storage server of claim 10, further comprising:
wherein block data is stored in a block map.

12. The storage server of claim 10, wherein the server uses a 010 invariant scheme.

13. The storage server of claim 12, wherein the 010 invariant scheme has been broken.

14. A computer-readable medium embodying instructions which, when executed by a processor, cause the processor to perform a method, the method comprising:
creating a plurality of snapshots of data stored in a storage system, each of the snapshots using one or more blocks, wherein a particular snapshot is 010 invariant if each block in the snapshot is 010 invariant, and wherein a block is 010 invariant if, once that block becomes used, and later becomes unused, that block is not used again;
storing the plurality of snapshots;
selecting a set of snapshots to be deleted;
determining, for the set of snapshots to be deleted, the number of blocks which are reclaimable if the set of snapshots are deleted, by determining the number of blocks which are exclusive to the set of snapshots to be deleted, wherein determining if a block is exclusive to the set of snapshots to be deleted includes:
if the set of snapshots are 010 invariant, comparing snapshots in the set to adjacent-in-time snapshots not in the set, for each block used in a snapshot in the set, determining whether the block is used by any of the adjacent-in-time snapshots not in the set, and determining that the block is exclusive to the set of snapshots if the block is not used by any of the adjacent-in-time snapshots not in the set; and if the set of snapshots are not 010 invariant, comparing snapshots in the set to all snapshots not in the set, for each block used in a snapshot in the set, determining whether the block is used by any of the snapshots not in the set, and determining that the block is exclusive to the set of snapshots if the block is not used by any of the snapshots not in the set; and deleting the set of snapshots, said deleting including reclaiming those blocks that are exclusive to the set of snapshots.

15. The computer-readable medium of claim 14, wherein block data is stored in a block map.

16. The computer-readable medium of claim 14, wherein the storage system uses a 010 invariant scheme.

17. The computer-readable medium of claim 16, wherein the 010 invariant scheme has been broken.

18. The method of claim 1, further comprising:
determining whether to delete the set of snapshots based on the determination of the number of blocks which are reclaimable.

19. The method of claim 1, wherein each of the snapshots represents a consistent file system, and wherein each block includes metadata that prevents the block from being overwritten or deleted until all snapshots that use that block are deleted.

20. The method of claim 1, wherein the storage system has an inode file system structure for storing the data, and wherein each of the plurality of snapshots is a snapshot inode.

21. The method of claim 1, further comprising:
   determining whether the set of snapshots to be deleted is 010 invariant.

22. The storage system of claim 5, wherein each of the snapshots represents a consistent file system, and wherein each block includes metadata that prevents the block from being overwritten or deleted until all snapshots that use that block are deleted.

23. The storage system of claim 5, wherein the storage system has an inode file system structure for storing the data, and wherein each of the plurality of snapshots is a snapshot inode.

24. The storage system of claim 5, further comprising:
   the space occupied module to determine whether the set of snapshots to be deleted are 010 invariant.

25. The storage server of claim 10, wherein each of the snapshots represents a consistent file system, and wherein each block includes metadata that prevents the block from being overwritten or deleted until all snapshots that use that block are deleted.

26. The storage server of claim 10, wherein the storage system has an inode file system structure for storing the data, and wherein each of the plurality of snapshots is a snapshot inode.

27. The storage server of claim 10, wherein the instructions further cause the processor to determine whether the set of snapshots to be deleted are 010 invariant.

28. The computer-readable medium of claim 14, wherein each of the snapshots represents a consistent file system, and wherein each block includes metadata that prevents the block from being overwritten or deleted until all snapshots that use that block are deleted.

29. The computer-readable medium of claim 14, wherein the storage system has an inode file system structure for storing the data, and wherein each of the plurality of snapshots is a snapshot inode.

30. The computer-readable medium of claim 14, the method further comprising:
   determining whether the set of snapshots to be deleted are 010 invariant.

* * * * *